(12) United States Patent
Usuba

(10) Patent No.: US 8,793,507 B2
(45) Date of Patent: Jul. 29, 2014

(54) INFORMATION PROCESSING APPARATUS, FILE ENCRYPTION DETERMINATION METHOD AND AUTHORITY DETERMINATION METHOD

(71) Applicant: NEC Corporation, Tokyo (JP)

(72) Inventor: Toshimitsu Usuba, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/755,080

(22) Filed: Jan. 31, 2013

(65) Prior Publication Data

US 2013/0246806 A1    Sep. 19, 2013

(30) Foreign Application Priority Data

Mar. 13, 2012   (JP) .................... 2012-055313

(51) Int. Cl.
*G06F 11/30*   (2006.01)
(52) U.S. Cl.
USPC .......................................... 713/189
(58) Field of Classification Search
USPC .............. 713/165, 189, 193; 726/30
See application file for complete search history.

(56) References Cited

U.S. PATENT DOCUMENTS

| | | | | |
|---|---|---|---|---|
| 5,796,825 | A * | 8/1998 | McDonnal et al. | 713/165 |
| 7,503,067 | B2 * | 3/2009 | Yeung et al. | 726/17 |
| 2004/0190715 | A1 * | 9/2004 | Nimura et al. | 380/44 |
| 2005/0278527 | A1 * | 12/2005 | Liao et al. | 713/165 |
| 2006/0184793 | A1 * | 8/2006 | Zizzi | 713/165 |
| 2013/0219501 | A1 * | 8/2013 | Park et al. | 726/23 |

FOREIGN PATENT DOCUMENTS

| | | |
|---|---|---|
| JP | H10260903 A | 9/1998 |
| JP | 2008134821 A | 6/2008 |

* cited by examiner

*Primary Examiner* — Beemnet Dada
(74) *Attorney, Agent, or Firm* — Sughrue Mion, PLLC

(57) ABSTRACT

An information processing apparatus includes an application operation file information holding unit 101 that holds application operation file information that is information related to a file operated by an application since activation of the application and includes information indicating whether the application has opened one or more encrypted files, and an encryption determination unit 102 that determines, with respect to an arbitrary file closed by an arbitrary application, whether the file is subjected to be encrypted based on the held application operation file information with regard to the application that has performed the closing operation of the file.

4 Claims, 10 Drawing Sheets

FIG. 9

| FILE HANDLE | PROCESS ID | HEAD POSITION INFORMATION | CURRENT POSITION INFORMATION | FILE SIZE | ... |
|---|---|---|---|---|---|
| 467 | 1122 | 0x12FFF0 | 0 | 1560 | ... |
| 234 | 5678 | 0x280F00 | 511 | 2240 | ... |
| ... | ... | ... | ... | ... | ... |

FIG. 10

| PROCESS ID | PROGRAM NAME | ... |
|---|---|---|
| 1122 | notepad.exe | ... |
| 2345 | POWERPNT.EXE | ... |
| ... | ... | ... |

INFORMATION PROCESSING APPARATUS, FILE ENCRYPTION DETERMINATION METHOD AND AUTHORITY DETERMINATION METHOD

CROSS-REFERENCE TO RELATED APPLICATION

This application is based upon and claims the benefit of priority from Japanese patent application No. 2012-055313, filed on Mar. 13, 2012, the disclosure of which is incorporated here in its entirety by reference.

TECHNICAL FIELD

The present invention relates to an information processing apparatus that automatically performs encryption, and a file encryption determination method thereof, and a computer-readable recording medium that records a file encryption determination program. Also, the present invention relates to an information processing apparatus that automatically determines operation authority to be authorized to a file, an authority determination method thereof, and a computer-readable recording medium that records an authority determination program.

BACKGROUND ART

To enhance confidentiality of a file, efforts to encrypt the file have been implemented. However, in a case where an encrypted file is used in an application, the encrypted file needs to be decrypted in advance before using except where a dedicated plug-in for a specific application is used, and therefore, the file may lose its confidentiality at the time of decryption.

Regarding a problem of losing confidentiality when an application uses an encrypted file, JP 2008-134821 A discloses a technology for providing a system in which various applications use an encrypted file. JP 2008-134821 A discloses that decryption processing or re-encryption processing of the encrypted file is performed by hooking an application program interface (API) provided by an operating system (OS).

Typically, when a file is encrypted without having an instruction by a user, it is necessary to set encryption criteria in order to determine whether an arbitrary file is a file to be encrypted. For example, an information processing apparatus disclosed in JP 2008-134821 A determines whether a file is subjected to be encrypted based on a content of the file to be processed with the hooked API. An example is disclosed in which whether a data format is MS-WORD is specified by determining whether a character string of a head of eight bytes is a predetermined character string by reference to a header of the data. Besides that, an example is disclosed, in which whether a file is subjected to be encrypted is determined by determining: whether the file is in accordance with a certain format, whether a character string such as "confidential" is included in a data body, whether personal information related to a name is included as a result of natural language processing, whether it is an image, whether the resolution of an image is a high resolution, and whether an image that accords with a human face is included as a result of image processing.

Further, for example, JP 10-260903 A discloses that a file handle table for controlling an encrypted file that is being open is prepared, a file operation request from an application program is hooked, and encryption and decryption are automatically performed. Further, JP 10-260903 A discloses that a directory to be encrypted and a user list capable of decrypting an encrypted file can be set for each user.

SUMMARY

An exemplary object of the invention is, in an information processing apparatus, to reduce useless encryption processing and to properly prevent omission of the encryption without specifying specific and individual encryption criteria that differ depending on a usage environment and a file to be processed.

Especially, another exemplary object of the invention is to perform encryption of data once specified as an important file without omission even if the encryption criteria are not specified.

Further, another exemplary object of the invention is, when a certain application opens a plurality of DRM files, to prevent unjustified easing of the authorities to operate files.

An information processing apparatus according to the present invention includes: an application operation file information holding unit configured to hold application operation file information that is information related to a file that has been operated by an application since activation of the application and includes information indicating whether the application has opened one or more encryption files; and an encryption determination unit configured, with respect to an arbitrary file closed by an arbitrary application, to determine whether the file is subjected to be encrypted based on the application operation file information held in the application operation file information holding unit with regard to the application having performed the closing operation of the file.

An information processing apparatus according to the present invention includes: an application operation file information holding unit configured to hold application operation file information that is information related to a file that has been operated by an application since activation of the application, and includes information indicating minimum authority that is the lowest authority among authorities granted to the file opened by the application; and an authority determination unit configured, with respect to a newly stored arbitrary file or an arbitrary file opened by an arbitrary application, to determine operation authority to be authorized to the file based on the application operation file information held in the application operation file information holding unit with regard to the application having performed a closing operation or the opening operation of the file.

A file encryption determination method according to the present invention, includes: causing a storage device to hold application operation file information that is information related to a file that has been operated by an application since activation of the application and includes information indicating whether the application has opened one or more encrypted files; and determining by an information processing apparatus, with respect to an arbitrary file closed by an arbitrary application, whether the file is subjected to be encrypted based on the application operation file information held in the storage device with regard to the application having performed the closing operation of the file.

An authority determination method according to the present invention includes: causing a storage device to hold application operation file information that is information related to a file that has been operated by an application since activation of the application, and includes information indicating minimum authority that is the lowest authority among authorities granted to the file opened by the application; and determining by an information processing apparatus, with respect to a newly stored arbitrary file or an arbitrary file opened by an arbitrary application, operation authority to be authorized to the file based on the application operation file information held in the storage device with regard to the application having performed a closing operation or the opening operation of the file.

A computer-readable recording medium recording a file encryption determination program according to the present invention causes a computer to execute: causing a storage device to hold application operation file information that is information related to a file operated by an application since activation of the application and includes information indicating whether the application has opened one or more encrypted files; and determining, with respect to an arbitrary file closed by an arbitrary application, whether the file is subjected to be encrypted based on the application operation file information held in the storage device in relation to the application having performed the closing operation of the file.

A computer-readable recording medium recording an authority determination program according to the present invention causes a computer to execute: causing a storage device to hold application operation file information that is information related to a file that has been operated by an application since activation of the application, and includes information indicating minimum authority that is the lowest authority among authorities granted to the file opened by the application; and determining, with respect to a newly stored arbitrary file or an arbitrary file opened by an arbitrary application, operation authority to be authorized to the file based on the application operation file information held in the storage device with regard to the application having performed a closing operation or the opening operation of the file.

BRIEF DESCRIPTION OF THE DRAWINGS

FIG. 9 is an explanatory diagram illustrating an example of information held in a file control information holding unit 526;

FIG. 10 is an explanatory diagram illustrating an example of information held in an application control information holding unit 527;

DESCRIPTION OF EXEMPLARY EMBODIMENT

Exemplary Embodiment 1

Figure 1:
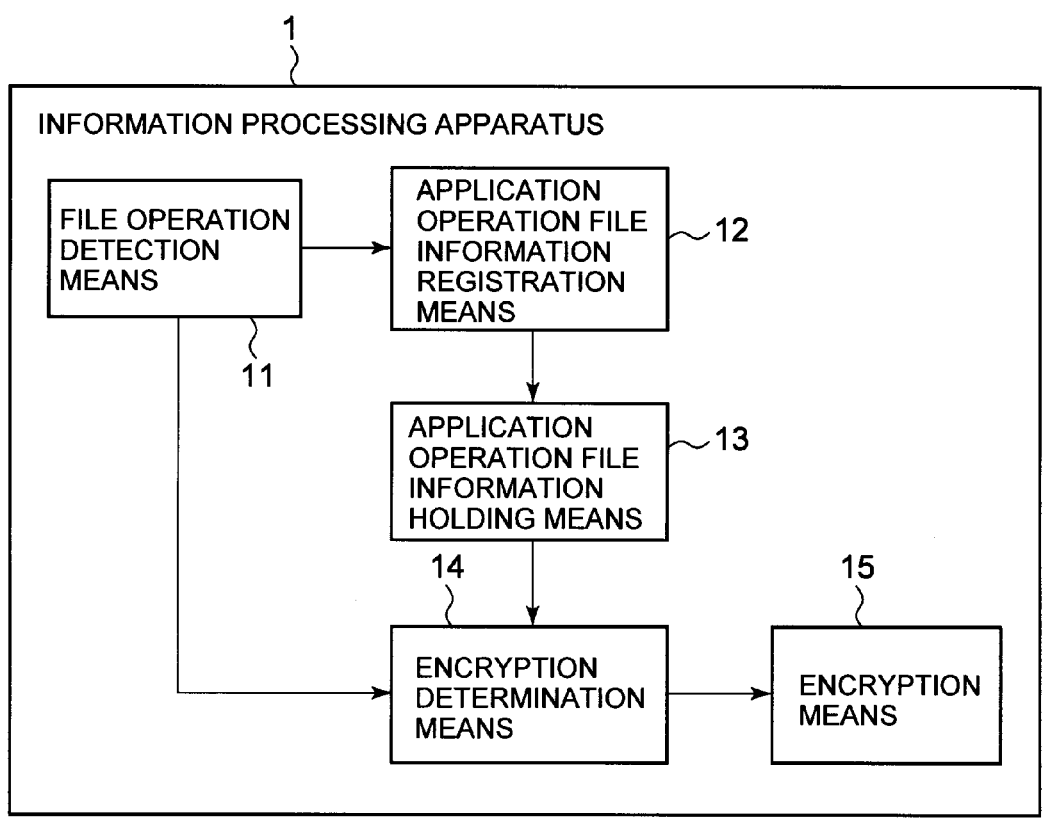
FIG. 1 is a block diagram illustrating a configuration example of an information processing apparatus according to a first exemplary embodiment.

Hereinafter, exemplary embodiments of the present invention will be described with reference to the drawings. FIG. 1 is block diagram illustrating a configuration example of an information processing apparatus according to a first exemplary embodiment of the present invention. An information processing apparatus 1 illustrated in FIG. 1 includes a file operation detection means 11, an application operation file information registration means 12, an application operation file information holding means 13, an encryption determination means 14, and an encryption means 15.

The file operation detection means 11 detects that a predetermined file operation has been performed or is to be performed by an application. For example, the file operation detection means 11 may detect a predetermined file operation request from the application by hooking an API for file operation provided by an operating system. In this case, the file operation detection means 11 at least detects the file operation request with which an opening operation or a closing operation of a file is performed.

The application operation file information registration means 12 acquires information of the application that is a requestor of the file operation and information of a file to be operated when the file operation detection means 11 detects that the application has performed the predetermined file operation request. Then, the application operation file information registration means 12 causes the application operation file information holding means 13 to hold necessary information as application operation file information from among the acquired information. Here, operations of not only registering the information but also rewriting or erasing already registered information are included. Hereinafter, these operations are collectively called "update".

The application operation file information registration means 12 causes the application operation file information holding means 13 to store, with respect to an arbitrary application that is at least currently in operation, information from which whether an encrypted file has been opened by the application from activation to termination of the application can be seen (for example, information related to a file that has been operated by the application that is currently in operation since activation of the application) as the application operation file information. Further, the application operation file information registration means 12 may have a function to delete or to clear the application operation file information related to the application at a time of activation or termination of the application. Further, the application operation file information registration means 12 may register information indicating whether the encrypted file has been correctly opened including whether the application is authorized to perform decryption and whether decryption processing has been succeeded in the application operation file information holding means 13.

The application operation file information holding means 13 is a storage means for holding the application operation file information. The application operation file information holding means 13 stores, as the application operation file information, information related to a file that has been operated by the application currently in operation since activation of the application. For example, the application operation file information holding means 13 may store information that associates information related to an application program that has opened an encrypted file and information related to a file has been opened by the application program. To be more specific, the application operation file information holding means 13 may store an identifier for identifying the application in association with an encrypted file operation flag that indicates whether an encrypted file is included in files that have been operated by the application since the activation of the application. Further, the application operation file information holding means 13 may include a time at which the file operation is performed and information of a user who operates the file operation.

The encryption determination means 14 determines, when the file operation detection means 11 detects that the application has performed a closing operation request of a file, whether the file to be processed is a file to be encrypted. The encryption determination means 14 determines whether the requestor application of the file closing operation has opened an encrypted file so far based on the application operation file information held in the application operation file information holding means 13. If one or more encrypted files have been opened, the encryption determination means 14 determines subsequent files to be closed to be files subjected to be encrypted.

The encryption means 15 encrypts a file based on a determination result of the encryption determination means 14.

In the present exemplary embodiment, the file operation detection means 11, the application operation file information registration means 12, the encryption determination means 14, and the encryption means 15 are realized by a CPU that operates according to a program, for example. Also, the application operation file information holding means 13 is realized by a storage device, for example. Also, the file operation detection means 11, the application operation file information registration means 12, the encryption determination means 14, and the encryption means 15 may be provided as an application program or a module, and may be operated by causing a CPU including in the information processing apparatus 1 to read the application program or the module. The program may be recorded on a computer-readable recording medium.

Figure 2:
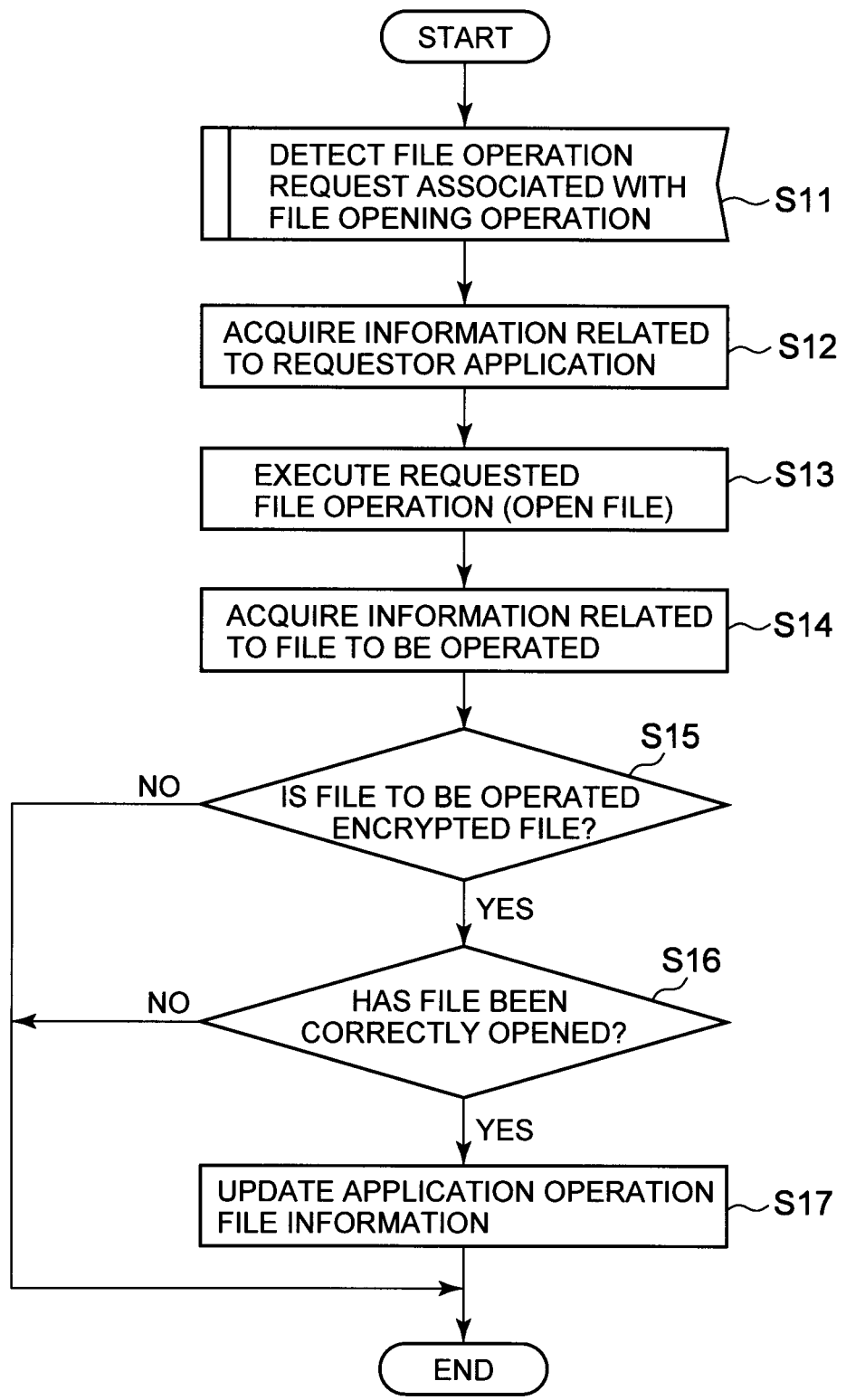
FIG. 2 is a flowchart illustrating an operation example of the information processing apparatus according to the first exemplary embodiment.
Figure 3:
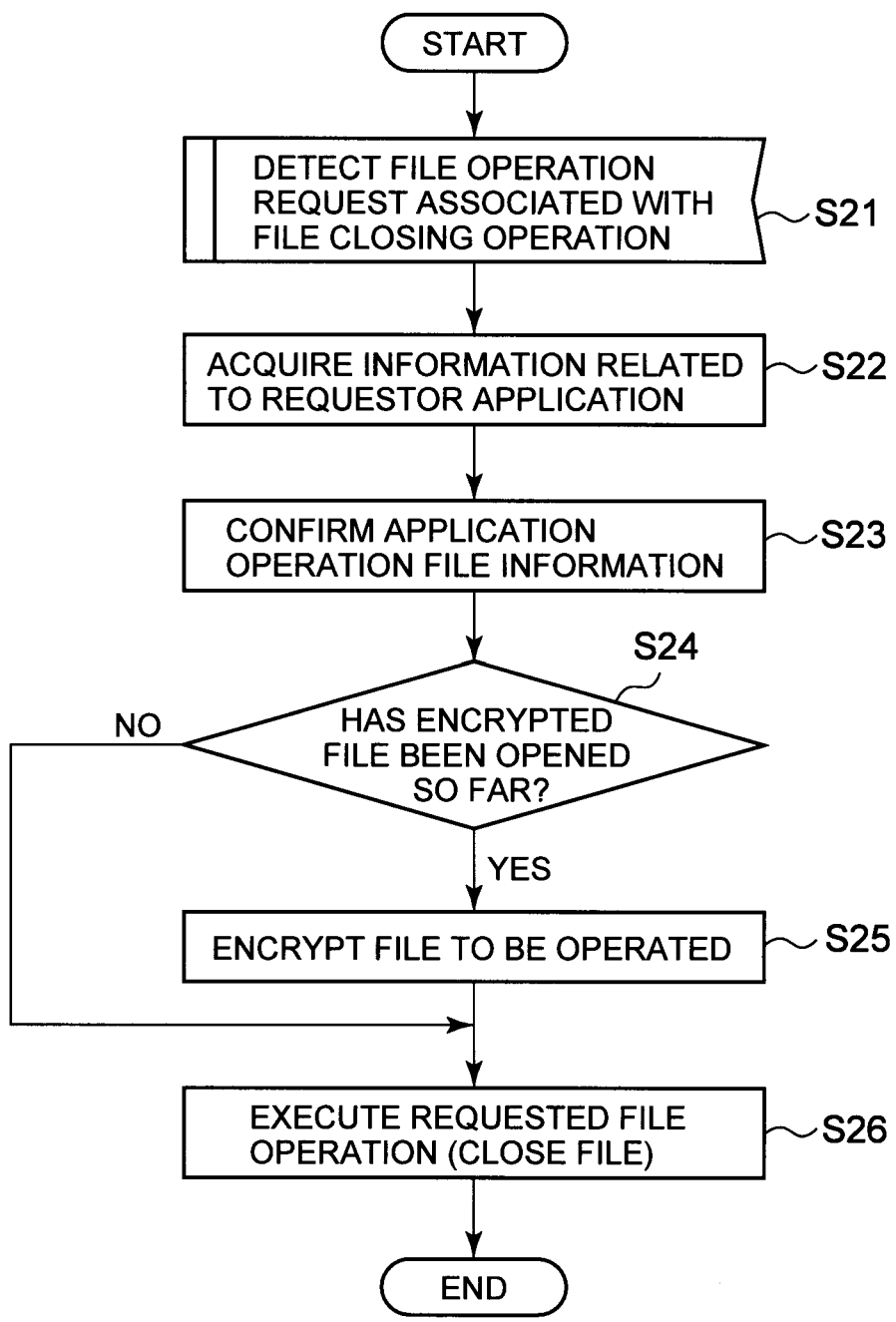
FIG. 3 is a flowchart illustrating an operation example of the information processing apparatus according to the first exemplary embodiment.

Next, an operation of the present exemplary embodiment will be described. FIGS. 2 and 3 are flowcharts illustrating an example of an operation of the information processing apparatus 1 according to the present exemplary embodiment. The operation of the present exemplary embodiment is roughly divided into two operations: an operation when the file operation request is detected with which the file opening operation is performed, and an operation when the file operation request is detected with which the file closing operation is performed.

FIG. 2 is a flowchart illustrating an example of an operation of the information processing apparatus 1 when the file operation request associated with the file opening operation is detected. An example illustrated in FIG. 2 starts with the file operation detection means 11 detecting the file operation request associated with the file opening operation (step S11).

When the file operation detection means 11 detects the file operation request associated with the file opening operation, the application operation file information registration means 12 acquires information related to the requestor application (step S12). The application operation file information registration means 12 may acquire, for example, a process ID of the requestor application or an application name.

Next, the application operation file information registration means 12 executes the requested file operation (here, the file opening operation) (step S13), and obtains information related to a file to be operated based on information obtained from the file operation (step S14). The application operation file information registration means 12 may obtain, for example, a file handle of the file to be operated of the file opening operation, a file identifier of the file, and header information.

Next, the application operation file information registration means 12 determines whether the file to be operated is an encrypted file, and whether the file has been correctly opened including decryption processing if the file is the encrypted file (steps S15 and S16). Here, in a case where the file to be operated is an encrypted file and has been correctly opened (Yes in step S15 and Yes in step S16), the application operation file information registration means 12 updates the application operation file information related to the requestor application (step S17). For example, the application operation file information registration means 12 may resister an encrypted file operation flag that indicates that the encrypted file has been opened in association with the process ID of the requestor application in the application operation file information holding means 13.

Note that examples of a file being not correctly opened include examples such that a specified file does not exist and the encrypted file cannot be decrypted (failure of the decryption or no authority of the decryption). On the other hand, a condition of a file being correctly opened means a condition in which the requestor application can subsequently freely handle with a content of the encrypted file.

Also, the application operation file information registered at this time is held during the application is in operation. For example, the application operation file information registration means 12 may perform clearing processing of the application operation file information related to the application when activation or termination of the application is detected.

Also, the above-described operation is performed on the assumption that the information processing apparatus 1 has already held one or more encrypted files. However, the encrypted files may be manually encrypted by a user operation or may be automatically encrypted according to other encryption criteria. Apparently, the files may be automatically encrypted according to the encryption criteria of the present invention.

Also, FIG. 3 is a flowchart illustrating an example of an operation of the information processing apparatus 1 when the file operation request associated with the file closing operation is detected. The example illustrated in FIG. 3 starts with the file operation detection means 11 detecting the file operation request associated with the file closing operation (step S21).

When the file operation detection means 11 detects the file operation request associated with the file closing operation, the encryption determination means 14 acquires information related to the requestor application, and reads out the application operation file information of the appropriate application based on the acquired information related to the requestor application from the application operation file information holding means 13 (steps S22 and S23).

Then, in a case where the requestor application has opened one or more encrypted files so far (Yes in step S24), the files are determined to be files to be encrypted, and encryption processing is requested to the encryption means 15. The encryption means 15 encrypts the files to be encrypted responding to a determination result of the encryption determination means 14 (step S25).

Following that, a requested file operation (here, the file closing operation) is executed (step S26).

Note that in a case where the file operation requested by the application is an operation associated with both of the file opening operation and the file closing operation, the above-described two operations may just be successively performed in a single detection.

As described above, in the present exemplary embodiment, automatic encryption processing is performed subjected to the encryption criteria, with respect to an arbitrary application operating on the information processing apparatus 1, that "the application has opened one or more encrypted files". Accordingly, useless encryption processing can be reduced and omission of the encryption can be properly prevented without setting and searching specific and individual encryption criteria. The reason is that the encryption criteria are not depending on a content of the processing by the application and a content of a file, and the encryption determination is performed based on recognition that data specified as an important file can be currently operated by which application.

Exemplary Embodiment 2

Next, a second exemplary embodiment according to the present invention will be described. In the first exemplary embodiment, the application operation file information is held and the determination of whether a file is subjected to be encrypted is performed based on the information from the point of view that data specified as an important file can be currently operated by which application. However, in the present exemplary embodiment, from a similar point of view, the application operation file information is used for granting proper authority to a file.

Figure 4:
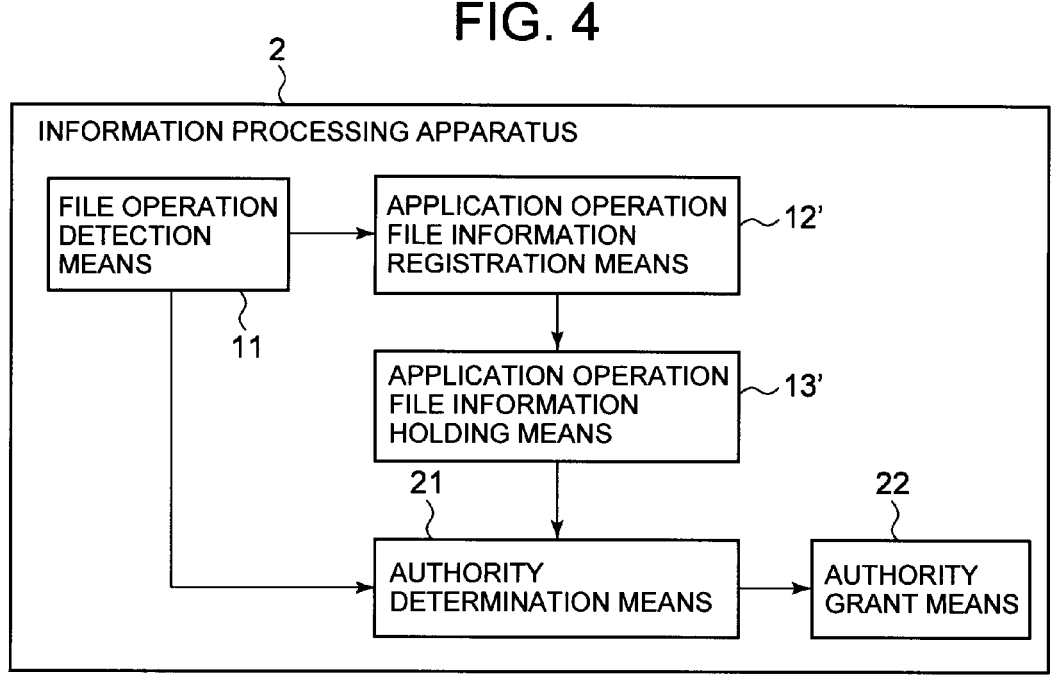
FIG. 4 is a block diagram illustrating a configuration example of an information processing apparatus according to a second exemplary embodiment.

FIG. 4 is a block diagram illustrating a configuration example of an information processing apparatus according to the present exemplary embodiment. In the example illustrated in FIG. 4, an information processing apparatus 2 includes an authority determination means 21 and an authority grant means 22 in place of the encryption determination means 14 and the encryption means 15 in the configuration illustrated in FIG. 1. Further, the application operation file information registration means 12 is changed into an application operation file information registration means 12', and the application operation file information holding means 13 is changed into an application operation file information holding means 13'.

The application operation file information registration means 12' causes the application operation file information holding means 13' to hold, as application operation file information, information indicating the lowest authority among authorities granted to files that have been opened by an application since activation of the application, that is, information indicating authority granted to a most restricted file among the files that have been opened so far.

The authority determination means 21 determines, when the file operation detection means 11 detects that the application has performed a predetermined file operation request, authority to be granted to the file based on the application operation file information held in the application operation file information holding means 13'.

The authority determination means 21 may determine that minimum authority is granted to a file to be operated at a time of closing the file from among the authority granted to the files that have been opened by an application that is a requestor of the file operation since activation of the application, for example.

Also, for example, at a time of opening a file, the authority determination means 21 may control the file to be operated with the lowest authority among the authority granted to the files (including the appropriate file) that have been opened by an application that is the requestor of the file operation since activation of the application irrespective of the authority granted to the file.

The authority grant means 22 grants, to a specified file or an application that operates the specified file, the authority related to the file based on the determination by the authority determination means 21.

As described above, according to the present exemplary embodiment, when the application has opened a plurality of DRM files in corporation with a DRM system, most restricted authority can be set to these arbitrary files at a time of storing the files or at a time of an operation by the application. Even when file content is transferred by the application, wrongly easing of the authority can be prevented.

Figure 5:
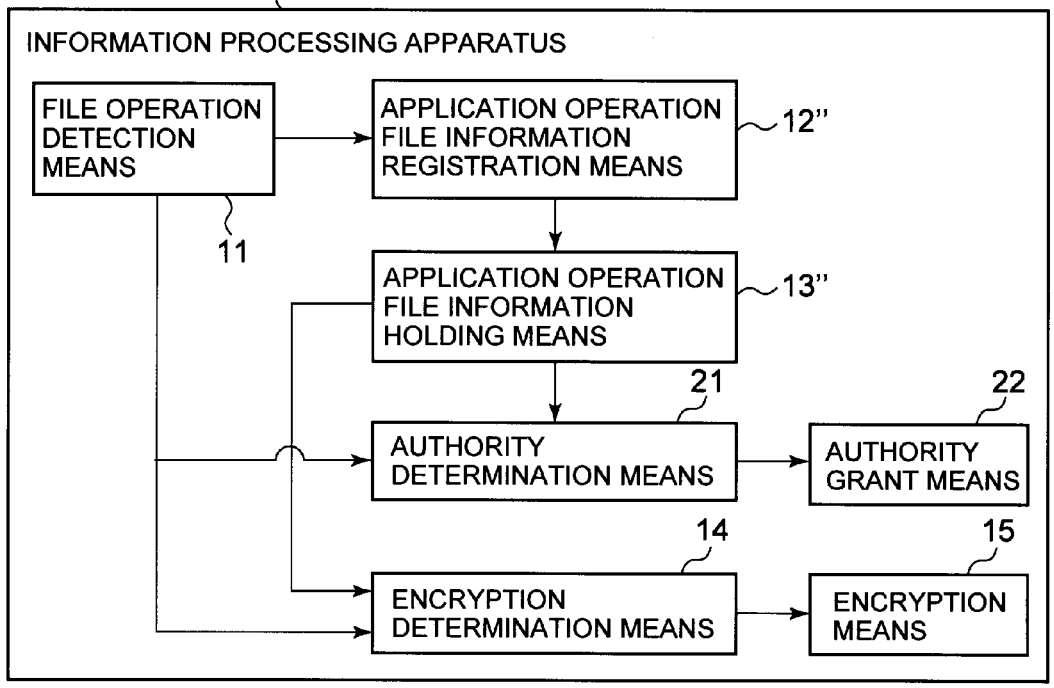
FIG. 5 is a block diagram illustrating another configuration example of the information processing apparatus according to the second exemplary embodiment.

Further, FIG. 5 is a block diagram illustrating another configuration example of the information processing apparatus according to the second exemplary embodiment. Like an information processing apparatus 3 illustrated in FIG. 5, the information processing apparatus 1 having the automatic encryption function illustrated in FIG. 1 and the information processing apparatus 2 illustrated in FIG. 4 can be combined and used. FIG. 5 is a block diagram illustrating another configuration example of the information processing apparatus according to the second exemplary embodiment. In this case, an application operation file information registration means 12" can cause an application operation file information holding means 13" to hold, as the application operation file information, with respect to an arbitrary application at least currently in operation, information indicating lowest authority among authorities granted to files that have been opened by the application since activation of the application, that is, information indicating authority granted to a most restricted file among files that have been opened so far, in addition to information indicating whether an encrypted file has been opened by the application from activation to termination of the application.

Further, when a file is automatically encrypted, the authority determination means 21 may grant, to the file, minimum authority among authorities granted to files that have been opened so far by an application that closes the file, for example.

Example 1

Figure 6:
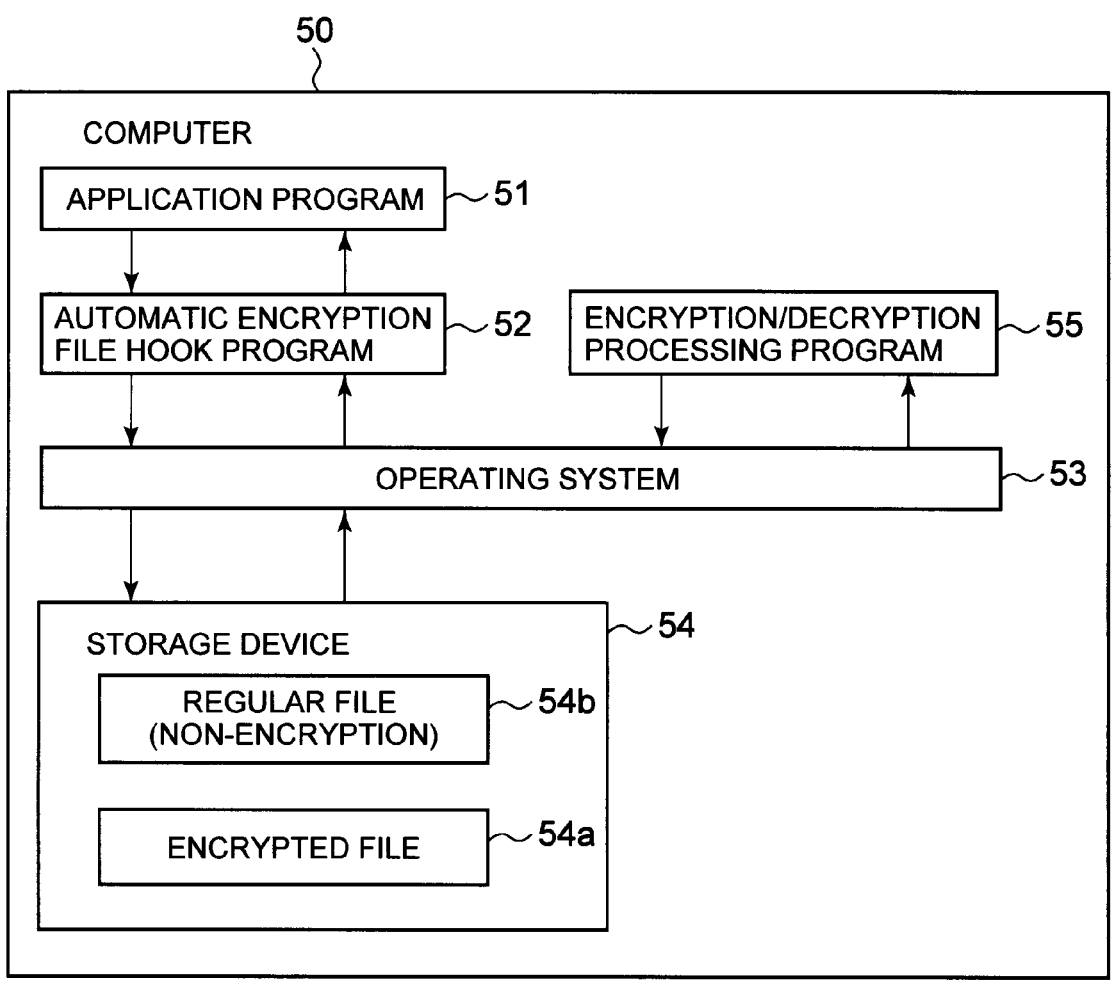
FIG. 6 is a block diagram illustrating a configuration example of an information processing apparatus (computer 50) according to the first example.

Hereinafter, the above-described exemplary embodiments will be described using an example. FIG. 6 is a block diagram illustrating another configuration example of the information processing apparatus of the present invention. FIG. 6 is a block diagram illustrating an example of a computer 50 that corresponds to an example of the information processing apparatus of the above-described first exemplary embodiment.

The computer 50 illustrated in FIG. 6 is, although the drawing is omitted, a typical information processing apparatus provided with a CPU as main control means, a ROM and a RAM as main storage means, a hard disk as an auxiliary storage means, a keyboard, a mouse, and a display as input/output interfaces, a LAN board as a communication interface, and the like. Further, an application program 51, an automatic encryption file hook program 52, an operating system 53, and an encryption/decryption processing program 55 are installed in the computer 50 as various functional means to operate such the physical means. Note that these programs can be provided by a communication means such as a network, or can be provided with a recording medium such as a CD-ROM in which the programs are stored.

The application program 51 is typical software for performing document creation, editing and the like. The operating system 53 is software for integrally controlling the computer 50. Note that examples of the operating system 53 include Windows and Linux (registered trademarks).

The automatic encryption file hook program 52 is software that hooks a program performing file processing on the operating system 53. To be specific, the automatic encryption file hook program 52 is software that hooks an API, which is included in the operating system 53 and performs the file processing, to perform various types of processing necessary for automatic encryption. Therefore, the file processing using the API by the application program 51 is performed through the automatic encryption file hook program 52. A method of realizing the hook may employ a well-known method.

Figure 8:
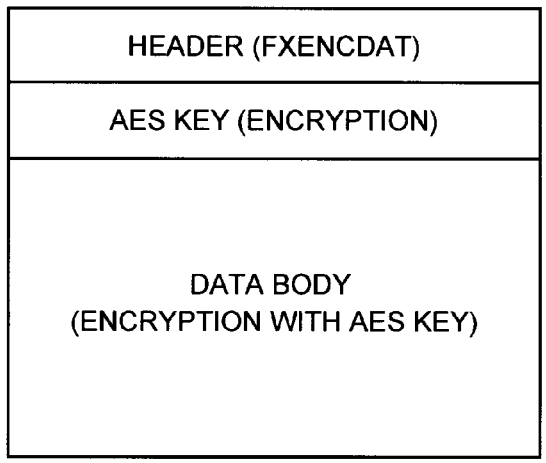
FIG. 8 is an explanatory diagram illustrating an example of a file structure of an automatically encrypted file.

Note that, in an example described below, as the API that performs the file processing, a case of hooking "CreateFile( )", "CloseHandle( )", and "Exitprocess( )" will be described. However, the API to be hooked is not limited to these APIs. For example, "ReadFile( )", "WriteFile( )", "SetFilePointer( )", "GetFileSize( )", and the like may be included. Note that these APIs perform various types of processing for absorbing a difference between an encrypted file and a non-encrypted file because a file configuration of the encrypted file as illustrated in FIG. 8 is different from that of the non-encrypted file. However, the various types of processing are not directly related to the processing of determining whether a file is subjected to be encrypted, and therefore, the description is omitted.

Here, to explain about a rough flow of the file processing using these APIs, first "CreateFile( )" is called and the file is opened, and an identifier called a "file handle" is passed to a caller application. When this file handle is specified and "ReadFile( )", "WriteFile( )" and the like are called, reading, writing and the like is performed to the appropriate file. Also, when "CloseHandle( )" is called, the file is closed and a series of the file processing is terminated. Also, when "ExitProcess( )" is called, the application program is terminated.

A storage device 54 includes a main storage means and an auxiliary storage means, and, in the present example, stores various types of data including a file and the like. Note that a regular file 54b and an encrypted file 54a are stored in an example illustrated in FIG. 6.

The encryption/decryption processing program 55 performs processing of encryption and decryption of the specified file. The encryption processing and the decryption processing performed by the encryption/decryption processing program 55 includes encryption processing and decryption processing performed when a user instructs the processing with a context menu and the like after selecting a file to be processed.

Figure 7:
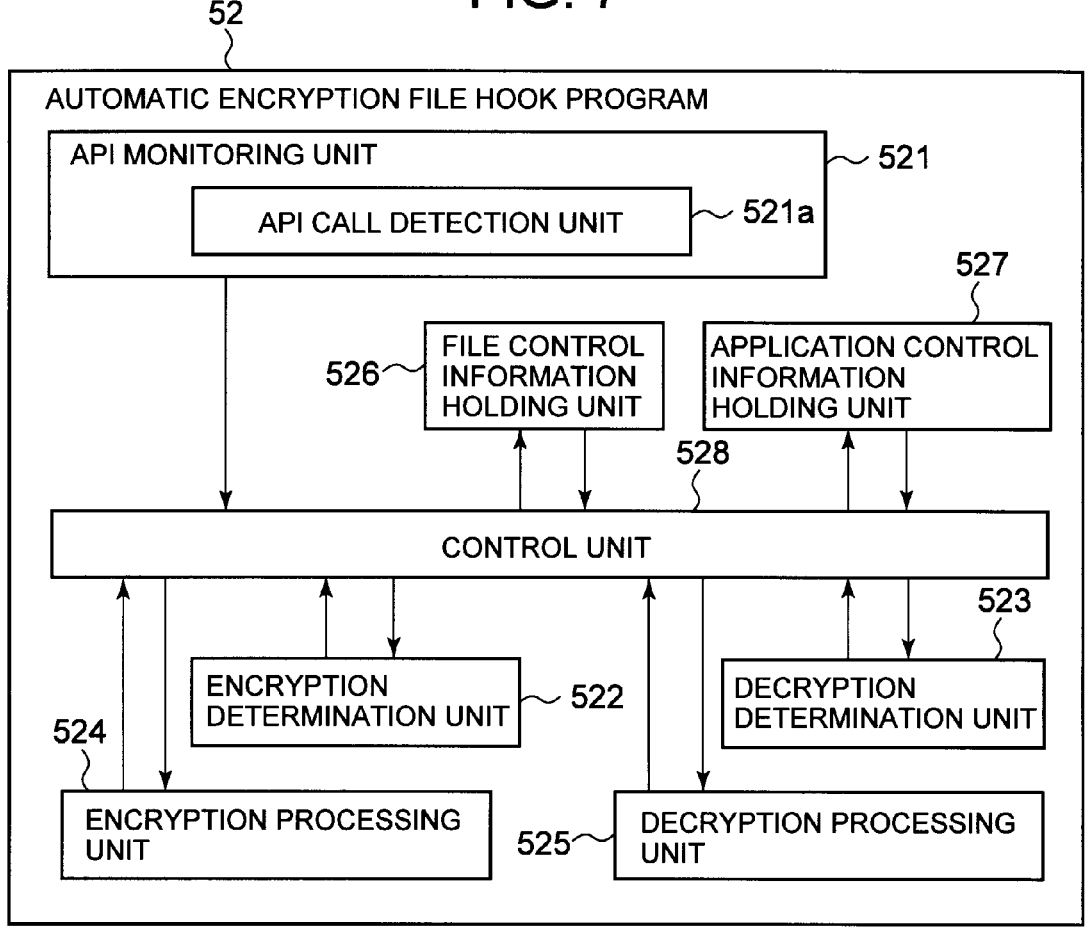
FIG. 7 is a functional block diagram illustrating a configuration example of an automatic encryption file hook program 52.

FIG. 7 is a functional block diagram illustrating a more specific configuration example of an automatic encryption file hook program 52. The automatic encryption file hook program 52 illustrated in FIG. 7 includes an API monitoring unit 521, an encryption determination unit 522, a decryption determination unit 523, an encryption processing unit 524, a decryption processing unit 525, a file control information holding unit 526, an application control information holding unit 527, and a control unit 528.

The API monitoring unit 521 monitors an API related to file processing. The API monitoring unit 521 includes, for example, an API call instruction detection unit 521a, and this API call instruction detection unit 521a may detect a call instruction of an API to be monitored from the application program 51.

When the API monitoring unit 521 detects the call instruction of the API to be monitored from the application as a result of monitoring the API, the encryption determination unit 522 determines whether a file to be processed in the API can be a file to be processed in encryption processing.

When the API monitoring unit 521 detects the call instruction of the API to be monitored from the application as a result of monitoring the API, the decryption determination unit 523 determines whether a file to be processed in the API is to be a file to be decrypted. Note that, in the present example, a file encrypted in the encryption processing unit 524 at least has a file structure like that illustrated in FIG. 8. The file structure illustrated in FIG. 8 has a character string of "FXENCDAT" written in a header in order to indicate the file is encrypted. Note that the identification method is not limited to the above. For example, the character string can be changed to an arbitrary character string. Note that, other than the above, a file can be identified with an identification of the file.

The encryption processing unit 524 performs encryption processing of a specified file corresponding to a determination result of the encryption determination unit 522.

The decryption processing unit 525 performs decryption processing of the specified file corresponding to a determination result of the decryption determination unit 523.

The file control information holding unit 526 holds information related to the file to be processed. The file control information holding unit 526 may hold, for example, a file control table like that illustrated in FIG. 9 as information related to the file to be processed. FIG. 9 is an explanatory diagram illustrating an example of the information held in the file control information holding unit 526. The file control table illustrated in FIG. 9 holds, in association with a file handle that functions as a file identifier, a process ID of an application program that uses the file, head position information that indicates a head position address of the file in a buffer, current position information that indicates a reading position of the file, and a file size that indicates the size of the file.

The application control information holding unit 527 holds information related to the application program that uses an encrypted file. The application control information holding unit 527 may hold an application control table like that illustrated in FIG. 10 as information related to the application that uses the encrypted file. FIG. 10 is an explanatory diagram illustrating an example of information held in the application control information holding unit 527. The application control table illustrated in FIG. 10 holds a program name that indicates an executable file name of the application program in association with the process ID that identifies a process as a unit of the application program.

The control unit 528 integrally controls various types of processing in the automatic encryption file hook program 52. Each processing function unit (for example, the API monitoring unit 521, the encryption determination unit 522, the decryption determination unit 523, the encryption processing unit 524, the decryption processing unit 525, the file control information holding unit 526, and the application control information holding unit 527) implemented in the automatic encryption file hook program 52 operates in accordance with an instruction from the control unit 528. Also, the control unit 528 controls an input/output of data generated among the processing function units.

Note that, in the present example, expression such that the application program 51, each processing function unit of the automatic encryption file hook program 52, the operating system 53, or the encryption/decryption processing program 55 performs various types of processing is used. In that case, the expression means that a CPU that reads out a program or a module thereof operates in accordance with the read out program or module to execute a code that defines the various types of processing. Also, expression such that the file control information holding unit 526 included in the automatic encryption file hook program 52 or the application control information holding unit 527 holds information. In that case, the expression means that the CPU operates in accordance with various types of definitions and processing included in the automatic encryption file hook program 52, so that a storage area for the file control information holding unit 526 or for the application control information holding unit 527 is secured in a storage device and the like, and data is stored in the storage area.

Figure 11:
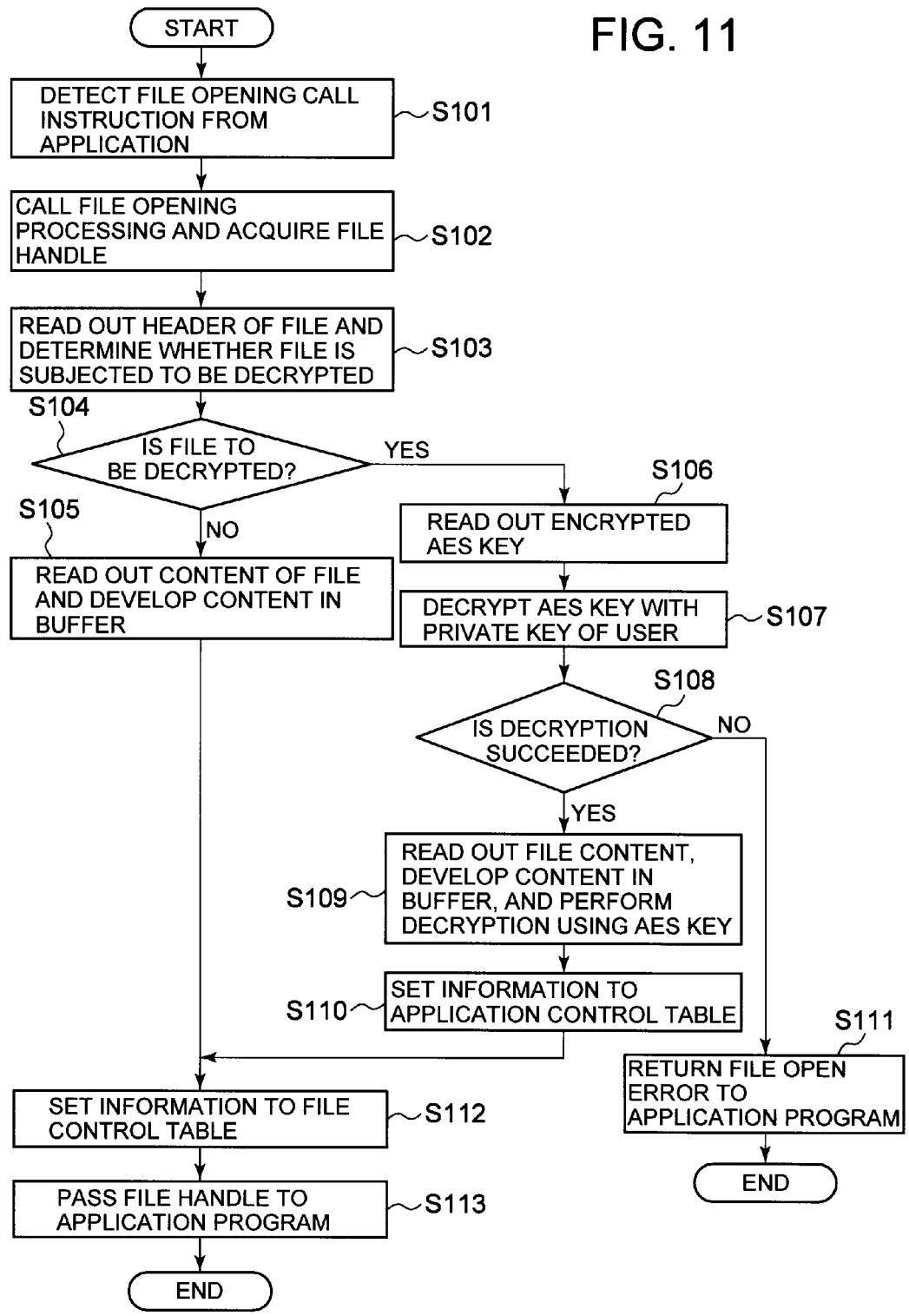
FIG. 11 is a flowchart illustrating an operation example of hook processing at a time of opening a file according to the first example.

Next, an operation of the present exemplary embodiment will be described. FIG. 11 is a flowchart illustrating an operation example of hook processing at a time of file opening among API hook processing by the automatic encryption file hook program 52. Note that FIG. 11 illustrates an operation example of the hook processing in the automatic encryption file hook program 52 at the time of file opening using the API "CreateFile( )" called at the time of file opening as an example.

As illustrated in FIG. 11, when a call of "CreateFile( )" is instructed from the application program 51, the API call instruction detection unit 521*a* of the automatic encryption file hook program 52 detects the call instruction (step S101). Note that, as parameters of this "CreateFile( )", a file name of a file to be processed, specification of a detailed operation method in accordance with authenticity of existence of a file, and the like are set.

When the call instruction is detected, the control unit 528 of the automatic encryption file hook program 52 calls the specified API "CreateFile( )", and opens a file with the called API (step S102). When the file is opened, a file handle is passed as a return value.

After the file is opened, the decryption determination unit 523 in the automatic encryption file hook program 52 determines whether the file to be processed is a file to be decrypted (step S103). The decryption determination unit 523 may perform the determination according to, for example, whether the character string "FXENCDAT" is set in the file header and whether the caller application of the API is an application program authorized to perform decryption of the file. In the present example, in a case where "FXENCDAT" is set in the file header and the caller is the application program authorized to perform decryption of the file, the file is determined to be a file to be decrypted. Note that an API such as "ReadFile( )" can be used for reference of the file header.

Note that determination criteria for authorizing decryption may employ a combination of a file extension, a user ID, a password, a group ID, a file path, expiration, the number of opening other than the caller application program.

As a result of the determination, when the file is determined not subjected to be decrypted (No in step S104), the control unit 528 that received the result reads out a data body as is from the file, and develops it into a buffer (step S105). Next, the file control information holding unit 526 that received an instruction from the control unit 528 sets, in the file control table as information related to the opened file, information including a process ID for identifying the application that opened the file (step S112). Following that, the control unit 528 passes the file handle to the application program 51 that called the API (step S113), and terminates a series of the processing with the call instruction of the API.

Meanwhile, as a result of the determination, when a file indicated by the passed file handle is determined to be a file to be decrypted (Yes in step S104), the control unit 528 that received the result reads out an encrypted advanced encryption standard (AES) key from the file (step S106), and causes the decryption processing unit 525 to decrypt the AES key using a private key of the user (step S107). Note that, if there is no private key, the AES key cannot be decrypted, and therefore, the processing may just be decryption failure (No in step S108). In this case, the control unit 528 returns an file open error to the application program 51 (step S111).

When the AES key has been decrypted with the private key (Yes in step S108), the decryption processing unit 525 then reads out the data body from the file, develops the data body to a buffer, and decrypts the data body using the decrypted AES key (step S109).

When the decryption processing by the decryption processing unit 525 is completed, the application control information holding unit 527 that received the instruction from the control unit 528 sets information related to the caller application to the application control table in order to indicate that the application has opened the encrypted file (step S110). Here, the application control information holding unit 527 registers, in the application control table, information including a process ID as an identifier for identifying the application program and a program name that indicates what the program is.

Following that, similar processing to the case in which a file not to be decrypted is opened may just be performed. That is, the file control information holding unit 526 sets information related to the file to the file control table (step S112), and then the control unit 528 passes the file handle to the application program 51 that called the API (step S113), and terminates a series of the processing with the call instruction of the API.

Figure 12:
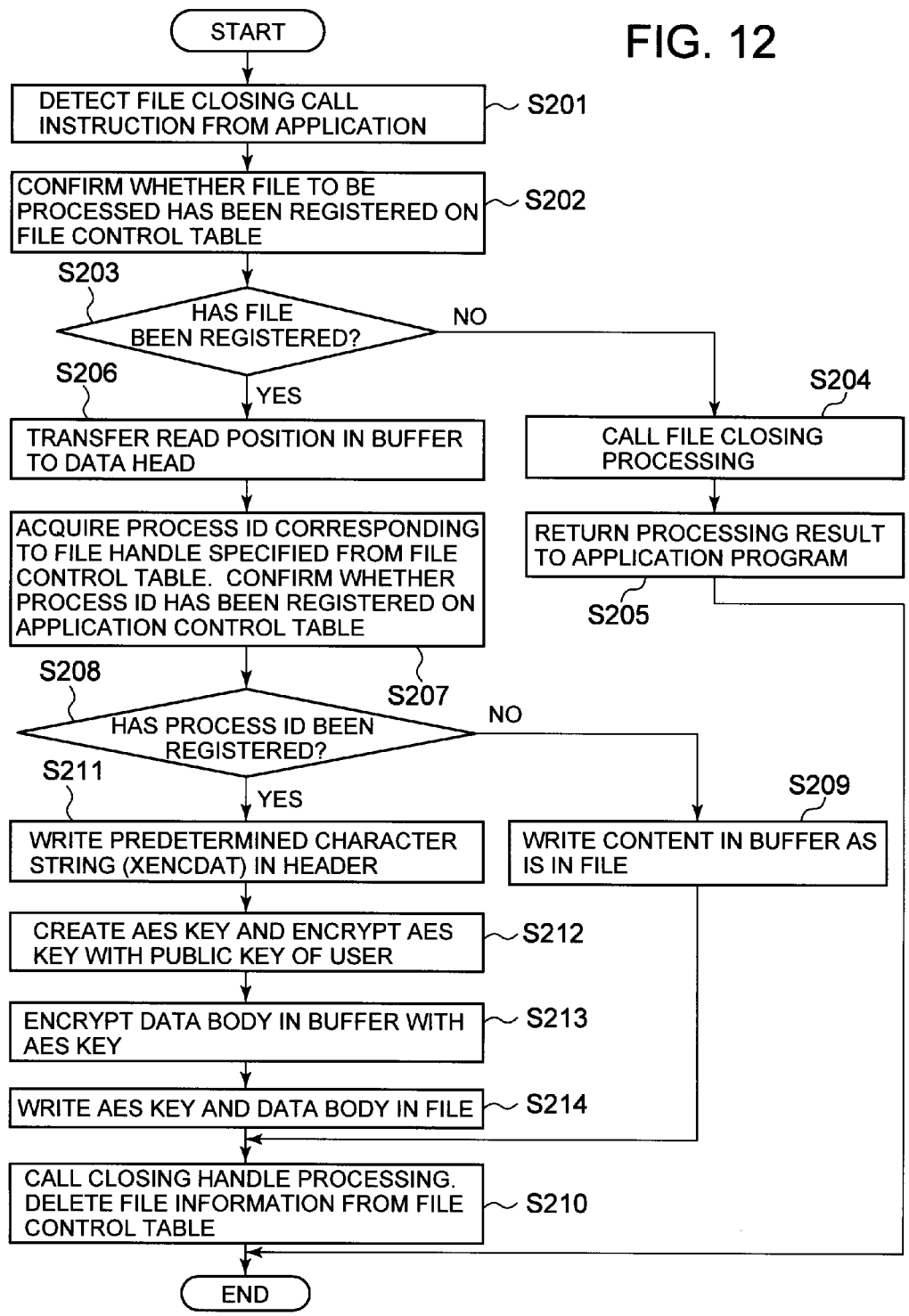
FIG. 12 is a flowchart illustrating an operation example of hook processing at a time of closing a file according to the first example.

Also, FIG. 12 is a flowchart illustrating an operation example of hook processing at a time of file closing among the API hook processing by the automatic encryption file hook program 52. Note that FIG. 12 illustrates an operation example of hook processing in the automatic encryption file hook program 52 at the time of file closing using the API "CloseHandle( )" called at the time of file closing as an example.

As illustrated in FIG. 12, when a call of "CloseHandle( )" is instructed from the application program 51, the API call instruction detection unit 521*a* of the automatic encryption file hook program 52 detects the call instruction (step S201). Note that a file handle and the like allocated to a file to be processed can be set as parameters of this "CloseHandle( )".

When the call instruction is detected, the control unit 528 of the automatic encryption file hook program 52 confirms whether a file to be processed with the called and instructed API has been registered in the file control table (step S202). This confirmation of whether the file has been registered is performed based on whether the file handle set as the parameter of "CloseHandle( )" has been registered in the file control table.

As a result of the confirmation, when the file to be processed has not been registered in the file control table (No in step S203), the control unit 528 calls "CloseHandle( )" and causes the called API to close the file (step S204). Then, a result thereof is passed to the application program 51 (step S205), and a series of the processing with the call instruction of the API is terminated.

Meanwhile, when the file to be processed is registered in the file control table (Yes in step S203), the control unit 528 calls "SetFilePointer( )", and transfers a reading position of data in a buffer to a head (step S206).

Next, the control unit 528 causes the file control information holding unit 526 to acquire the process ID corresponding to the file handle from the file control table, and confirms whether the acquired process ID has been registered in the file control table (step S207).

As a result of the confirmation, when the specified process ID has not been registered in the file control table (No in step S208), the control unit 528 writes a content of the buffer as is on the file (step S209), and calls and causes "CloseHandle( )" to close the file. At the same time, the control unit 528 deletes corresponding file information in the file control table (step S210), and terminates a series of the processing with the call instruction of the API.

Meanwhile, when the specified process ID has been registered in the file control table (Yes in step S208), encryption processing by the encryption processing unit 524 is initiated. In this encryption processing, a header in which a predetermined character string is written is first written in the file (step S211).

When the writing of the header is completed, the encryption processing unit 524 generates an AES key, and encrypts the generated AES key using a public key of the user (step S212). Also, the encryption processing unit 524 encrypts a data body in a buffer using the generated AES key (step S213). Following that, the encryption processing unit 524 writes the AES key encrypted using the public key and the encrypted data body using the AES key in the file (step S214), and terminates the encryption processing.

When the encryption processing by the encryption processing unit 524 is terminated, the control unit 528 calls and causes "CloseHandle( )" to close the file, deletes the corresponding file information in the file control table (step S210), and terminates a series of the processing with the call instruction of the API.

Next, an operation of the automatic encryption file hook program 52 of hook processing at a time of process termination will be described. Note that, here, a hook operation at the time of process termination will be described using "ExitProcess( )" as an example, which is called at the time of process termination of an application in operation.

When a call of "ExitProcess( )" is instructed from the application program 51, the API call instruction detection unit 521a detects the call instruction. When the call instruction is detected, the control unit 528 terminates a process by calling "ExitProcess( )" while deleting corresponding application information in the application control table.

As described above, according to the present example, the automatic encryption file hook program 52 controls the information indicating whether an application operated on the computer 50 has opened one or more encrypted files so far, and determines whether a file is to be encrypted at the time of closing the file based on the information using the file control information holding unit 526 and the application control information holding unit 527. Therefore, useless encryption processing can be prevented and omission of the encryption can be properly prevented without setting specific and individual encryption criteria.

Note that in the above-described example, a case of hooking an API provided in Windows has been described. However, similar APIs are prepared in other operating systems. Therefore, in a case of the other operating systems, processing similar to the above description may be performed by hooking such similar APIs.

Also, the present invention is not limited to the examples described above and illustrated in the drawings, and can be modified and practiced without departing from the scope of the invention. Here, some modifications will be listed.

For example, a practical application in cooperation with a DRM system as below is possible. That is, the lowest operation authority among operation authorities granted to files opened by the application is held in an application control table, and encryption in the encryption processing (steps S211 to S214 in FIG. 12) is performed by granting the lowest authority held in the application control table of the application that opened the file. This allows the most restricted authority to be set in a new stored file, and can prevent creation of a file having less restricted authority when a plurality of DRM files is opened.

For example, when a file A to which only "edit, copy/paste" is authorized and a file B to which only "edit, copy/paste, print" is authorized are opened in one application. In a previous DRM system, by copying and saving a content of the file A to the file B, the content of the file A can be printed under the authority of the file B. To prevent unjustified easing of the authority by transferring a file content like this, equivalent authority to that of the file A, "edit, copy/paste", is granted to the file B as the minimum authority among the authority of the files opened by the application when the file B is stored.

Further, as another example in corporation with the DRM system, each application may be operated with the minimum authority held in the application control table of the application. In the above-described example, when the file B or the file A is opened, equivalent authority to that of the file A, "edit, copy/paste", is granted to the currently opened files A and B as the minimum authority among the authority of the files opened by the application, so that the unjustified easing of the authority of the file B before being stored can be prevented.

Note that, in each of the above-described example, an example has been described in which a file is determined to be a file to be encrypted or the minimum authority is granted on the assumption that a process ID corresponds to a file one on one, and when an application identified by the process ID opens an important file, there is a possibility that files to be subsequently handled by the application may be files in which a content of the previously opened important file is overwritten or transferred (files stored under a different name).

However, the process ID does not necessarily correspond to a file one on one. For example, one process opens a plurality of files depending on the application. In such a case, even if an application identified with a certain process ID opens an important file, other program cannot see which buffer controls the content of the important file in the process. In such a case, there is a possibility that all files to be subsequently handled by the application may be files in which the content of the previously opened important file are overwritten or transferred (files stored with different names). Therefore, these files are subjected to be encrypted or to which the minimum authority is granted. Note that, in this case, files that do not necessarily need to be encrypted may be encrypted or to which the minimum authority may be granted. As compared with a case in which the application name is specified and the files are equally encrypted, less useless encryption processing is performed. Further, the user can manually cancel the encryption later if not necessary. Therefore, it is more favorable compared with a case in which omission occurs because a file is not subjected to be encrypted.

Note that even in a case where the process ID corresponds to a file one on one like a memo pad application, there is a possibility that the file content may be transferred between the memo pad applications. Therefore, if it is desired to apply the encryption criteria to such a case, whether an encrypted file is opened or the minimum authority of the file can be controlled in a unit of the application name instead of a unit of the process ID. That is, the information of the application that has been controlled in a unit of the process ID may be controlled in a unit of the application name. By doing so, when at least one application having the same application name is activated and if an application having the application name has opened one or more encrypted files, files to be stored by the applications can be determined to be files to be encrypted only during applications having the same application name have been activated since then. Also, for example, when at least one application having the same application name is initiated, an application having the application name can be operated with the minimum authority among the authority granted to files opened by an application having the same application name, or can provide the minimum authority to files to be subsequently stored.

Figure 13:
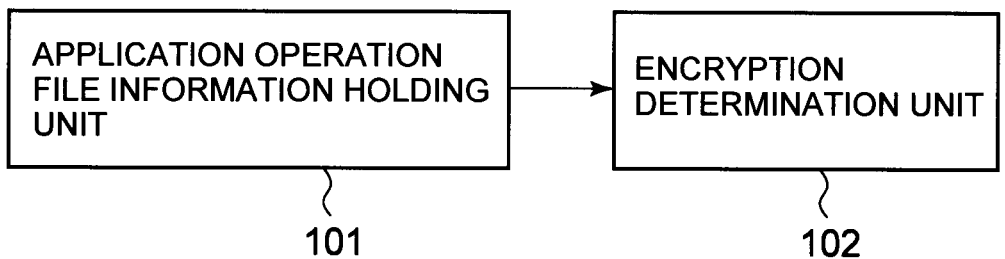
FIG. 13 is a block diagram illustrating an outline of the present invention.
Figure 14:
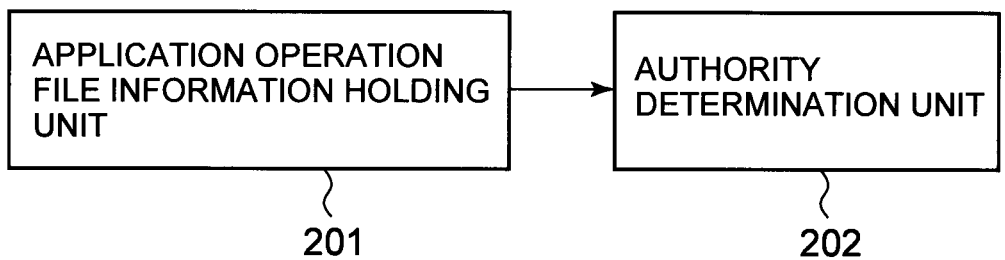
FIG. 14 is a block diagram illustrating an outline of the present invention.

Next, an outline of the present invention will be described. FIGS. 13 and 14 are block diagrams illustrating an outline of the information processing apparatus of the present invention.

The information processing apparatus illustrated in FIG. 13 is an information processing apparatus that automatically performs encryption, and includes an application operation file information holding unit 101 and an encryption determination unit 102.

The application operation file information holding unit 101 holds application operation file information that is information related to files that have been operated by an application since activation of the application and includes information indicating whether the application has opened one or more encrypted files. The application operation file information holding unit 101 is, for example, identified in a unit of the process ID or of the application name, and may hold, with regard to an arbitrary application operated on the information processing apparatus, information related to files that have been operated by the application since activation of the application. Note that the application operation file information holding unit 101 is illustrated as the application operation file information holding means 13 and the application control information holding unit 527 in the above-described exemplary embodiments.

The encryption determination unit 102 determines, with regard to an arbitrary file closed by an arbitrary application, whether the file is subjected to be encrypted based on the application operation file information held in the application operation file information holding unit. Note that the encryption determination unit 102 is illustrated as the encryption determination means 14 and the encryption determination unit 522 in the above-described exemplary embodiments.

With such a structure, useless encryption processing can be reduced and omission of the decryption can be properly prevented without setting specific and individual encryption criteria.

Also, the encryption determination unit 102 may determine, for example, if an application that closed an arbitrary file has opened one or more encrypted files since activation of the application, the file may be set to be a file to be encrypted.

Also, the information processing apparatus according to the present invention includes a file operation detection unit that detects a predetermined file operation request from an application, an application operation file information registration unit that updates application operation file information to be held in an application operation file information holding unit by acquiring information of the application as a requestor of the file operation request and information of a file to be operated when the file operation detection unit detects that the application has performed a file operation request associated with an opening operation of a file, and an encryption unit that performs encryption processing of a specified file. An encryption determination unit may determine, when the file operation detection unit detects that the application has performed the file operation request associated with a closing operation of a file, whether a file to be operated is subjected to be encrypted based on the application operation file information held in the application operation file information holding unit with regard to the requestor application of the file operation, and an encryption unit may perform the encryption processing of the file determined subjected to be encrypted by the encryption determination unit.

Further, when the file operation detection unit detects that the application has performed a file operation request associated with an opening operation of a file, the application operation file information registration unit may cause the application operation file information holding unit to hold the application operation file information including information that indicates the application has opened one or more encrypted files in a case where the file to be operated is an encrypted file, and the application is an application authorized to perform decryption of an encrypted file and has correctly decrypted the encrypted file.

Also, a file control information holding unit may be provided, which holds a file handle in association with information that identifies an application that has opened the file.

Further, the information processing apparatus illustrated in FIG. 14 is an information processing apparatus that automatically determines operation authority to be authorized to a file, and includes the application operation file information holding unit 201 and the authority determination unit 202.

The application operation file information holding unit 201 holds application operation file information that is information related to files that have been operated by an application since activation of the application, and includes information indicating minimum authority that is the lowest authority among operation authorities granted to the files opened by the application. Note that the application operation file information holding unit 201 is illustrated as the application operation file information holding means 13' and the application control information holding unit 527 in the above-described exemplary embodiment.

The authority determination unit 202 determines, with regard to a newly stored arbitrary file or an arbitrary file opened by an arbitrary application, operation authority to be authorized to the file based on the application operation file information held in the application operation file information holding unit with regard to the application that performed the opening or closing operation of the file.

With such a configuration, ineffective easing of operation authority of an application authorized to a file can be prevented.

Note that the example of the information processing apparatus illustrated in FIG. 14 may be further provided with a file operation detection unit that detects a predetermined file operation request from an application, an authority grant unit that controls to grant specified authority to an specified file, and a file control information holding unit that holds a file handle of a file in association with information that identifies an application that opens the file.

According to methods disclosed in Japanese patent application laid-open publications No. 2008-134821 and No. 10-260903, encryption or decryption of a file can be performed at a time of operation of an application program without providing an explicit instruction of the encryption or the decryption by the user. However, it is extremely difficult to properly set encryption criteria to be applied to an information processing apparatus that automatically performs the encryption. When the encryption criteria are not properly set, problems may occur such that a large number of files are uselessly encrypted, or on the contrary, necessary files are not encrypted and therefore the confidentiality cannot be retained. Especially, in a case where the encryption criteria are narrowly set, there is a highly possibility of occurring encryption omission.

For example, when a directory name, an application name, and a user ID are specified in the encryption criteria, and automatic encryption processing is equally performed, there is a concern that even a large number of files originally not requiring the encryption may be encrypted, and the processing speed is reduced. Also, a directory structure, a held application name, a user ID allowed to login, and the like vary depending on a usage environment, and it is not only difficult but also troublesome to specify a range necessary for the encryption without causing omission using such a specific and individual content that differs depending on the usage environment.

Note that, according to a method of determining whether a file is subjected to be encrypted based on a file content such as an image and a characteristic string included in a file to be stored, useless encryption processing according to an equal condition specified in a unit of an application, of a directory, or of a user may be omitted. However, the file content of a file that handles confidential information does not always include a character string, an image, or personal information that explicitly indicates the file is a file to be encrypted such as "confidential", and it is extremely difficult to specify the encryption criteria with respect to various types of unknown files without causing omission.

By the way, as an example of a condition in which the encryption omission is more likely to occur when the encryption is automatically performed, there is a case in which, after an encrypted file is opened, a part of the content of the file is amended and stored. Because the already encrypted file is opened, it can be said that there is a high possibility that the file content held in the application may include confidential information. However, if the user subsequently deletes a character string such as "confidential" included in the file body, and stores the file with a different name, or stores the file in a different place, the file does not accord with the encryption criteria, and the encryption may not be performed. The problem in this case lies in the fact that the case does not consider performing the encryption determination based on a current location of data of a file once specified as an important file and which application operates the file.

Further, other program of not considering the current location of data of a file once specified as an important file and which application operates the file is as follows. That is, in a case where the information processing apparatus is operated in corporation with a digital rights management (DRM) system, and when a certain application opens a plurality of DRM files and transfers file contents, operation authority granted to newly stored files may not have any restrictions even if confidential matters are transferred.

According to the present invention, in an information processing apparatus that automatically performs encryption, useless encryption processing can be reduced and omission of the encryption can be properly prevented without setting specific and individual encryption criteria that vary according to a usage environment or a file to be processed.

The present invention is applicable to a general information processing apparatus that perform various types of file processing and file processing program irrespective of usage of the apparatus itself.

The whole or part of the exemplary embodiments disclosed above can be described as, but not limited to, the following supplementary notes.

(Supplementary Note 1)

An information processing apparatus, including: an application operation file information holding unit for holding application operation file information that is information related to a file that has been operated by an application since activation of the application and includes information indicating whether the application has opened one or more encryption files; and an encryption determination unit for, with respect to an arbitrary file closed by an arbitrary application, determining whether the file is subjected to be encrypted based on the application operation file information held in the application operation file information holding unit in relation to the application having performed the closing operation of the file.

(Supplementary Note 2)

The information processing apparatus according to supplementary note 1, wherein, when the application having performed the closing operation of the arbitrary file has opened one or more encrypted files since activation of the application, the encryption determination unit determines that the file is a file to be encrypted.

(Supplementary Note 3)

The information processing apparatus according to supplementary note 1, further including: a file operation detection unit for detecting a predetermined file operation request from an application; an application operation file information registration unit for, when the file operation detection unit detects that an application has performed a file operation request associated with an opening operation of a file, acquiring information of the application that is a requestor of the file operation request and information of the file to be operated, and updating the application operation file information to be held in the application operation file information holding unit; and an encryption unit for performing encryption processing of a specified file, wherein the encryption determination unit, when the file operation detection unit detects that the application has performed a file operation request associated with a closing operation of a file, determines whether the file to be operated is to be a file to be encrypted based on the application operation file information held in the application operation file information holding unit in relation to the application as the requestor of the file operation, and the encryption unit performs the encryption processing of the file to be encrypted determined by the encryption determination unit.

(Supplementary Note 4)

The information processing apparatus according to supplementary note 3, wherein, when the file operation detection unit detects that an application has performed a file operation request associated with an opening operation of a file, and when the file to be operated is an encrypted file and the application is an application authorized to perform decryption of the encrypted file, and has correctly performed decryption, the application operation file information registration unit causes the application operation file information holding unit to hold the application operation file information including information indicating the application has opened one or more encrypted files.

(Supplementary Note 5)

The information processing apparatus according to supplementary notes 1, further including a file control information holding unit for holding a file handle of a file in association with information identifying an application opening the file.

(Supplementary Note 6)

An information processing apparatus, including: an application operation file information holding unit for holding application operation file information that is information related to a file that has been operated by an application since activation of the application, and includes information indicating minimum authority that is the lowest authority among authorities granted to the file opened by the application; and an authority determination unit for, with respect to a newly stored arbitrary file or an arbitrary file opened by an arbitrary application, determining operation authority to be authorized to the file based on the application operation file information held in the application operation file information holding unit in relation to the application having performed a closing operation or the opening operation of the file.

(Supplementary Note 7)

A file encryption determination method, including: causing a storage device to hold application operation file information that is information related to a file that has been operated by an application since activation of the application and includes information indicating whether the application has opened one or more encrypted files; and determining by an information processing apparatus, with respect to an arbitrary file closed by an arbitrary application, whether the file is subjected to be encrypted based on the application operation file information held in the storage device in relation to the application having performed the closing operation of the file.

(Supplementary Note 8)

An authority determination method, including: causing a storage device to hold application operation file information that is information related to a file that has been operated by an application since activation of the application, and includes information indicating minimum authority that is the lowest authority among authorities granted to the file opened by the application; and determining by an information processing apparatus, with respect to a newly stored arbitrary file or an arbitrary file opened by an arbitrary application, operation authority to be authorized to the file based on the application operation file information held in the storage device in relation to the application having performed a closing operation or the opening operation of the file.

(Supplementary Note 9)

A computer-readable recording medium recording a file encryption determination program for causing a computer to execute: causing a storage device to hold application operation file information that is information related to a file operated by an application since activation of the application and includes information indicating whether the application has opened one or more encrypted files; and determining, with respect to an arbitrary file closed by an arbitrary application, whether the file is subjected to be encrypted based on the application operation file information held in the storage device in relation to the application having performed the closing operation of the file.

(Supplementary Note 10)

A computer-readable recording medium recording an authority determination program for causing a computer to execute: causing a storage device to hold application operation file information that is information related to a file that has been operated by an application since activation of the application, and includes information indicating minimum authority that is the lowest authority among authorities granted to the file opened by the application; and determining, with respect to a newly stored arbitrary file or an arbitrary file opened by an arbitrary application, operation authority to be authorized to the file based on the application operation file information held in the storage device in relation to the application having performed a closing operation or the opening operation of the file.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

The invention claimed is:

1. An information processing apparatus, comprising:
an application operation file information holding unit configured to hold application operation file information related to a file that has been operated by an application since activation of the application and including information indicating whether the application has opened one or more encryption files;
an encryption determination unit configured to determine, with respect to an arbitrary file closed by an arbitrary application, whether the file is subjected to be encrypted based on:
the application operation file information held in the application operation file information holding unit, and
in relation to the application having performed the closing operation of the file; and
a file control information holding unit for holding a file handle of a file in association with information identifying an application opening the file;
wherein, the encryption determination unit is further configured to determine, when the application having performed the closing operation of the arbitrary file has opened one or more encrypted files since activation of the application, that the file is a file to be encrypted.

2. The information processing apparatus according to claim 1, further comprising:
a file operation detection unit for detecting a predetermined file operation request from an application;
an application operation file information registration unit for, when the file operation detection unit detects that an application has performed a file operation request associated with an opening operation of a file, acquiring information of the application that is a requestor of the file operation request and information of the file to be operated, and updating the application operation file information to be held in the application operation file information holding unit; and
an encryption unit for performing encryption processing of a specified file,
wherein the encryption determination unit, when the file operation detection unit detects that the application has performed a file operation request associated with a closing operation of a file, determines whether the file to be operated is subjected to be encrypted based on the application operation file information held in the application operation file information holding unit with regard to the application as the requestor of the file operation, and
the encryption unit performs the encryption processing of the file to be encrypted determined by the encryption determination unit.

3. The information processing apparatus according to claim 2, wherein, when the file operation detection unit detects that an application has performed a file operation request associated with an opening operation of a file, and when the file to be operated is an encrypted file and the application is an application authorized to perform decryption of the encrypted file, and has correctly performed decryption, the application operation file information registration unit causes the application operation file information holding unit to hold the application operation file information including information indicating the application has opened one or more encrypted files.

4. A file encryption determination method, comprising:
causing a storage device to hold application operation file information related to a file operated by an application since activation of the application and including information indicating whether the application has opened one or more encrypted files; and
determining, by an information processing apparatus, with respect to an arbitrary file closed by an arbitrary application, whether the file is subjected to be encrypted based on:
the application operation file information held in the storage device, and with regard to the application having performed the closing operation of the file;
holding, by a file control information holding unit, a file handle of a file in association with information identifying an application opening the file; and
determining, when the application having performed the closing operation of the arbitrary file has opened one or more encrypted files since activation of the application, that the file is a file to be encrypted.

* * * * *